United States Patent Office 2,792,431
Patented May 14, 1957

2,792,431

HYDROGENATION OF OLEFIN OZONIDES TO PRIMARY ALCOHOLS

Karl Friedrich Johannes Niebling, Pieter Leendert Kooijman, and Gottfried Ernst Rumscheidt, Amsterdam, Netherlands, and Philip James Garner, Wirral, England, assignors to Shell Development Company, New York, N. Y., a corporation of Delaware No Drawing. Application August 12, 1954,
Serial No. 449,494

Claims priority, application Great Britain August 18, 1953

6 Claims. (Cl. 260—632)

This invention relates to a process for the preparation of aliphatic alcohols. More particularly, this invention relates to a method for preparing aliphatic primary alcohols and aliphatic alpha, omega diols by a process comprising two-stage controlled temperature hydrogenation of reaction products of ozone with mono-olefinically unsaturated hydrocarbons.

It is known in the art that mono-olefinically unsaturated hydrocarbons will react with ozone. The products of this reaction, or ozonides, range from compounds having a relatively simple structure to compounds having a highly complex structure. The simple products of the reaction, or monomers, are referred to as olefin ozonides. Their structure is believed to conform to one or the other of the two formulas:

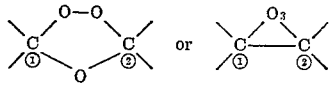

The more complex ozonides are polymeric in nature. Their structure has not been fully ascertained. They can be referred to simply as polymeric olefin ozonides. The term "olefin ozonide" will be used herein to include both the monomeric and polymeric reaction products of ozone with mono-olefinically unsaturated hydrocarbons.

There have been reported in the literature certain experiments in which such ozonides have been catalytically hydrogenated. For example, Fischer et al. (Berichte der Deutschen Chemischen Gesellschaft, 65, 1467–1472 (1932)), report the results of several such experiments. These investigators reported that the primary products of the catalytic hydrogenation of olefin ozonides were aldehydes, formed according to the equation:

(I) 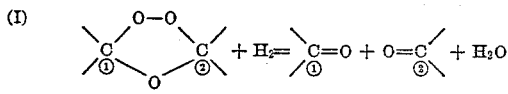

They also stated that there was also formed the corresponding acid, according to the equation:

(II) 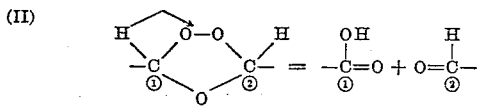

The authors stated that the yield of acid increased approximately in proportion to the increase in reaction temperature. The formation of alcoholic products was not reported.

It has now been discovered that olefin ozonides may be converted to alcohols in yields approaching 90% of the ozonide fed by catalytically hydrogenating the ozonide at a low temperature and then catalytically hydrogenating the resulting mixture at an elevated temperature, the hydrogen pressure being substantially above atmospheric pressure in both of the hydrogenation stages.

This discovery provides the basis for a practical process for the production of primary alcohols or alpha, omega-diols from the ozonides of mono-olefinically unsaturated hydrocarbons, wherein the ozonide is catalytically hydrogenated at a temperature below about 30° C. and the resulting reaction mixture is catalytically hydrogenated at a temperature above about 90° C., the hydrogen pressure in both of the hydrogenation stages being substantially above atmospheric pressure.

The reaction which occurs when the olefin ozonide is treated according to this procedure is believed represented by the equation:

(III) 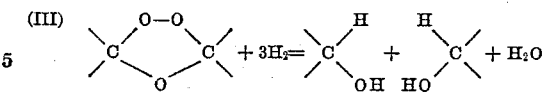

The nature of the reaction occurring during each of the hydrogenation stages is not known.

Thus, primary alcohols are prepared from the ozonides of alpha mono-olefins having one more carbon atom, methanol being the principal by-product:

(IV) 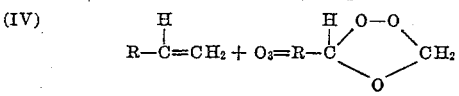

(V) 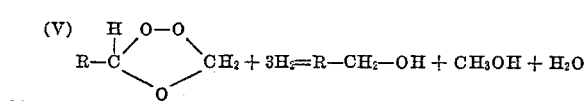

R represents a hydrocarbyl group.

Alpha, omega-diols having the same number of carbon atoms as the mono-olefin are prepared from the ozonides of mono-olefinically unsaturated non-aromatic cyclic hydrocarbons, such as hexene:

(VI) 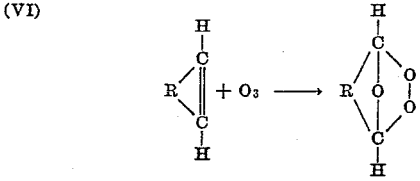

(VII) 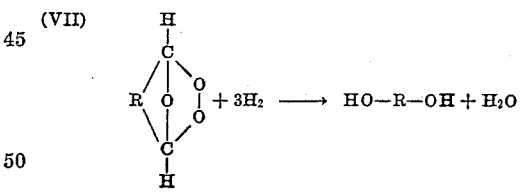

R represents a linear hydrocarbyl group.

The preparation of the ozonides of mono-olefinically unsaturated hydrocarbons is a well known general process and details thereof will be familiar to those skilled in the art. The method is exemplified in the article by Henne et al., J. Am. Chem. Soc., 65, 2183–5 (1943).

Briefly described, such ozonides are prepared in substantially quantitative yields by passing an ozone containing gas (normally a mixture of oxygen and ozone) into the olefin, preferably in admixture with an anhydrous diluent liquid which is a solvent for the ozonide product. The ozonization is carried out at reaction temperatures within the range of from about −40° C. to about +35° C. Since the ozonide product is often subject to attack by ozone, precautions are normally taken to prevent addition of ozone after the desired reaction has gone to substantial completion.

As has heretofore been stated, there is at present some disagreement as to the precise structure to be assigned to the reaction products of ozone with mono-olefinically unsaturated hydrocarbons, especially the polymeric products thereof. In view of these difficulties, and for convenience in designation and definition of the ozonide reactant, the ozone-olefin reaction products will be referred to herein as "olefin ozonides" or as "the ozonide of (particular olefin or class of olefins)." The ozonide reactants will thus be defined in terms of the olefins from which they were derived. Support for the use of such terminology appears throughout the summary of the ozonolysis art given by Louis Long, Jr. (Chemical Reviews, 27, 437–493 (1940)), and especially in the introductory portions thereof, and further in such patents as that issued to Foster, et al. (U. S. 2,657,240, issued October 27, 1953).

As the ozonide reactant, there may be used the ozonide of any mono-olefinically unsaturated aliphatic hydrocarbon—i. e., the ozonide of any straight-chain, branched-chain or non-aromatic cyclic hydrocarbon. Included within this class of olefins are the straight-chain and branched-chain alkenes, such as alpha and beta butylene, iso-butylene, hexene-1, heptene-1, octene-1, and their isomers, such as octene-2, 2-methyl-2-heptene, 6-methyl-1-heptene, 8-methyl-1-nonene, 2,4-dimethyl-1-octene, cetene, hexadecene-1 and the like. While the olefinic unsaturation may be located at any position in the carbon chain, it is preferred that it be located in the alpha position— i. e., between the carbon atoms in the number one and number two positions in the chain. The ozonides of substituted olefins are also satisfactory, provided the substituent atom or group is substantially inert and does not interfere with the desired reaction. Thus, the ozonides of aryl substituted aliphatic mono-olefins, such as styrene, p-methyl styrene, allyl benzene, stilbene, tetraphenylethylene and the like may be employed in the new process to give the corresponding alcohols.

In practice, the ozonides of mixtures of straight-chain alpha olefins, such as are obtained in the cracking of petroleum fractions, constitute a highly desirable class of the ozonide reactants. The ozonides of such alpha olefins having from about six to about eight carbon atoms per molecule are especially desirable. The alcohol products in such cases are primary alcohols containing from about five to about seven carbon atoms per molecule.

Also suitable as the ozonide reactant are the ozonides of cycloalkenes such as cyclopentene, cyclohexene and the like. Where a cyclic olefin is the initial reactant, the alcohol product will be an alpha, omega-diol, rather than a primary alcohol. Thus, where the ozonide of cyclohexene is hydrogenated according to the new process, hexanediol-1,6 is the product:

(VIII) 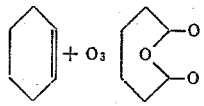

(IX) 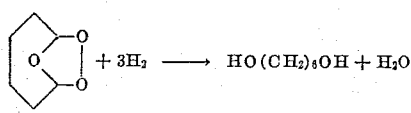

The ozonide reactant thus may be generically designated as the ozonide of a mono-olefinically unsaturated hydrocarbon having the general formula:

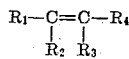

wherein $R_1$, $R_2$, $R_3$ and $R_4$ each represents a member of the group consisting of the hydrogen atom and hydrocarbyl radicals, and wherein $R_2$ and $R_3$ together may represent a divalent hydrocarbon radical, the terminal valencies of which are each linked to a different carbon atom, as shown in the formula. Preferred members of the group include those wherein $R_2$, $R_3$ and $R_4$ each represent a hydrogen atom and $R_1$ represents an aliphatic hydrocarbyl radical having from about 4 to about 16 carbon atoms—i. e., alpha mono-olefins having from about 6 to about 18 carbon atoms per molecule. A further preferred group comprises those compounds represented by the above formula in which $R_2$ and $R_3$ together represent a divalent aliphatic hydrocarbyl radical in which each of the free valencies is joined to a different terminal carbon atom of the radical, especially those wherein such divalent hydrocarbon radicals contain from about 3 to about 10 carbon atoms—i. e., cyclic mono-olefins containing from about 5 to about 14 carbon atoms.

The first hydrogenation stage of the new process is carried out by passing a molecular hydrogen containing gas into a reactor containing a vigorously stirred mixture comprising the ozonide, a hydrogenation catalyst and, preferably, an inert liquid which is a solvent for the ozonide, until the hydrogen pressure is at least 5 atmospheres, the temperature being maintained below about 30° C. This reaction is continued until it is evident that no more hydrogen is being taken up by the mixture, the mixture being stirred vigorously throughout this period and the temperature being maintained below about 30° C., and preferably below about 20° C. The hydrogen pressure should not be allowed to fall below about 5 atmospheres at any time, and preferably should be at least 20 atmospheres. The duration of this reaction depends in part upon the degree of agitation, as well as upon the nature of the reactants, the catalyst and the solvent or diluent used. In general the reaction will require at least about 30 minutes, a reaction period of from about one to about five hours generally being sufficient. Longer reaction periods are not to be considered unusual.

Following completion of the first hydrogenation stage, the reaction mixture is then subjected to hydrogenation at a temperature above about 90° C. This hydrogenation is most conveniently accomplished by simply heating the entire reaction mixture to the desired temperature, adding catalyst, diluent or solvent and additional hydrogen as necessary. For continuous operation, it may be desirable to conduct the two hydrogenation stages in two reactors, maintaining the appropriate temperature level and other process conditions in the two stages.

This second hydrogenation stage may be carried out according to either of two general techniques, each of which forms a variant of the new process. In the first of these techniques, the temperature is at once raised to substantially the final level and there maintained until the reaction is complete, as evidenced by cessation in hydrogen consumption. In the second of these techniques, the temperature is raised to an intermediate level, and there held until the reaction is about one-third to about one-half complete, when the temperature is raised to the final level and there maintained until the reaction is completed. The final hydrogenation temperature must be above about 90° C., and preferably is not above 300° C. The preferred temperature range for the second hydrogenation stage lies between about 100° C. and about 200° C. Where the final temperature is attained in a two-step manner, the intermediate temperature preferably lies within the range of from about 100° C. to about 150° C.

The over-all duration of the second hydrogenation stage also depends in part upon the particular reactants and reaction conditions. In general, reaction is complete within about 10 hours, from about one hour to about six hours being the usual time required.

In the preferred practice of the invention, the hydrogenation is carried out in the following manner: (a) the first stage hydrogenation is carried out at a temperature below about 20° C., the pressure being maintained within the range of from about 10 to about 30 atmospheres; (b) the second stage hydrogenation is then effected by heating the mixture to from about 100° C. to about 150° C. the pressure being maintained constant; (c) the temperature is then raised to from about 130° C. to about 250° C. and the pressure raised to from about 30 atmospheres to about 50 atmospheres and reaction continued until complete.

The hydrogenation stages are both conducted in liquid phase. The liquid phase may consist of the ozonide, if it be a liquid under the conditions of temperature and pressure existing in the reactor or, preferably, it consists of an inert organic liquid which will remain a liquid at the conditions within the reactor, and which is preferably a solvent for the components of the reaction mixture, especially the ozonide. Suitable liquids include, inter alia, one or more alkanes boiling at a temperature of higher than about 80° C., for example, the various isomers of hexane, heptane, octane, decane and the like. Especially suitable are the aromatic-free hydrocarbon petroleum fractions boiling within the range of from about 80° C. to about 100° C. Also suitable as the solvent are the lower aliphatic alcohols, such as methanol, ethanol and the like. It may be especially convenient to use as solvent the same lower aliphatic alcohol as is formed by hydrogenation of the ozonide. For example, where the ozonide of decene-2 is hydrogenated according to the process of the invention, octanol-1 and ethanol are the principal products. It would thus be highly convenient to use ethanol as the hydrogenation solvent, since the separation of the desired product would be much simplified. Sufficient solvent should be used to dissolve completely all of the components of the reaction mixture and a substantial excess—perhaps 50% to 200% excess—is desirable.

As the catalyst, there may be employed any hydrogenation catalyst. In the majority of cases, excellent results may be obtained by employing relatively inexpensive, readily prepared and easily regenerated base metal catalysts which process the desired degree of activity. For example, base metal catalysts comprising metals such as copper, chromium, thallium, nickel, iron, cobalt and the like are particularly suitable, especially when employed in a finely divided state or deposited on a suitable carrier. The term "base metal" is used to designate those metals which, in contrast to the noble metals, are oxidized to an appreciable extent when exposed to air. Pyrophoric nickel, iron and cobalt catalysts are particularly suitable for use as the catalyst in the hydrogenation of the ozonides. While the base metal catalysts are preferred, it is to be understood that the noble metal catalysts, such as silver, gold, platinum, palladium, osmium, ruthenium, rhodium, iridium and the like may also be employed. Mixture of one or more noble metals with one or more base metals may also be employed to advantage in some cases.

The amount of catalytic material to be added depends in part upon the particular catalyst used, and its activity level in the particular system, and in part upon the reaction conditions, such as the proportion of inert liquid diluent present in the reaction mixture and the degree of agitation of that mixture accomplished. If finely divided nickel on a porous carrier is used as catalyst, for example, the amount of active material required will usually lie within the range of from about 1% to about 30% by weight with respect to the amount of ozonide charged. If the proportion of inert liquid diluent added is relatively small, and vigorous stirring is achieved, approximately 2% by weight of active material will normally be sufficient. More than about 20% by weight of active material is rarely necessary.

As the molecular hydrogen containing gas, there may be used any gaseous mixture containing a major proportion of molecular hydrogen.

The present invention is illustrated by the following examples:

*Example I*

300 grams of cetene were mixed with 3 liters of iso-octane in a vessel having a capacity of approximately 5 liters. A small quantity of an alcoholic solution of dyestuff which is decolorized by ozone was added to the mixture. A gaseous mixture comprising 85% by volume of oxygen and 15% by volume of ozone was then introduced into the vessel at a rate of approximately 2 moles of ozone per hour. The temperature of the reaction mixture was maintained at 20° C. by means of external cooling. After approximately ¾ hour, the disappearance of the dye coloration showed that ozonization of the olefin was complete. 1.34 moles of ozone had been absorbed.

The total reaction mixture obtained was transferred to a rotating autoclave together with 300 grams of a catalyst and 7 liters of iso-octane. The catalyst consisted of finely divided nickel on porous kieselguhr, the nickel content of the catalyst being approximately 20% by weight.

The reaction mixture was saturated with hydrogen for two hours at approximately 20° C. and under a hydrogen pressure of 20 atmospheres. Hydrogenation was then effected by heating for one hour at 125° C. under a hydrogen pressure of 20 atmospheres, and subsequently heating for 1½ hours at 140° C. under a hydrogen pressure of 40 atmospheres.

After the hydrogenation reaction had taken place, the catalyst was separated from the liquid and the resulting liquid was distilled. A distillate fraction boiling below 99° C. of approximately 50 ml. was found to consist largely of methyl alcohol, in that it reacted with phenyl isocyanate to form phenyl methyl urethane which was identified by means of its melting point of 47° C., the accepted melting point for phenyl methyl urethane being also 47° C. Above 99° C., approximately 10 liters of a liquid consisting largely of the diluent iso-octane were distilled off. A solid residue of 270 grams was obtained of melting point 42° C., and this residue was identified as pentadecanol-1 which substance has an accepted melting point of 43° C. The addition of phenyl isocyanate to the residue caused the formation of phenyl pentadecenyl urethane of melting point 72° C., the accepted melting point for this substance being also 72° C.

The yield of pentadecanol-1 was at least 72% with respect to the olefin, as was confirmed by infra-red analysis data. It is probable that in reality the yield was higher but that the losses due to the various manipulations were relatively large in this case.

The second addition of liquid diluent was necessary in this case owing to the capacity of the autoclave which was employed. Such addition is not an essential feature of the process of the present invention.

*Example II*

Employing the procedure described in the first paragraph of Example I, the ozonides of a technical mixture of $C_{12}$—$C_{16}$ olefins prepared by the catalytic cracking of wax stock were obtained.

These ozonides were then hydrogenated according to the procedure described in the second paragraph of Example I. There was obtained a 61% yield of $C_{11}$—$C_{15}$ primary alcohols.

*Example III*

The ozonide of hexadecene-1 was prepared by the method described in Example I and was hydrogenated at 120° C. and 75 atmospheres hydrogen pressure. The yield of pentadecanol-1 was 90%.

*Example IV*

Example I was repeated exactly, but for one exception—the reaction mixture was hydrogenated in a single step—i. e., the hydrogen was passed directly into the hot reaction mixture. The yield of alcohols was less than half of that obtained in Example I.

We claim as our invention:

1. A process for the production of alcohols which comprises reacting an olefin ozonide with molecular hydrogen in liquid phase and in the presence of a metal hydrogenation catalyst at a temperature below about 30° C., and reacting the resulting mixture with molecular hydrogen in liquid phase and in the presence of a metal hydrogenation catalyst at a temperature above about 90° C., the hydrogen pressure in both of the hydrogenation steps being at least 5 atmospheres, and the said ozonide and said molecular hydrogen being the only reactants and the said metal catalyst being the only catalyst charged to the reaction system.

2. A process for the production of alcohols which comprises reacting molecular hydrogen with an ozonide of a mono-olefinically unsaturated hydrocarbon in the presence of a metal hydrogenation catalyst and an inert liquid diluent at a temperature below about 30° C. and under a hydrogen pressure of at least 5 atmospheres, and thereafter reacting the resulting reaction mixture with molecular hydrogen at a temperature above about 90° C., under a hydrogen pressure of at least 5 atmospheres and in the presence of a metal hydrogenation catalyst and an inert liquid diluent, the said ozonide and said molecular hydrogen being the only reactants and the said metal catalyst being the only catalyst charged to the reaction system.

3. A process for the production of alcohols which comprises reacting an ozonide of a mono-olefinically unsaturated aliphatic hydrocarbon with molecular hydrogen in liquid phase and in the presence of a metal hydrogenation catalyst at a temperature below about 30° C., and under a hydrogen pressure of at least 5 atmospheres and reacting the resulting mixture with molecular hydrogen in liquid phase and in the presence of a metal hydrogenation catalyst at a temperature above about 90° C. and a hydrogen pressure of at least 5 atmospheres, the said ozonide and the said molecular hydrogen being the only reactants and the said metal catalyst being the only catalyst charged to the reaction system.

4. A process for the production of primary acyclic alcohols which comprises reacting an ozonide of a mono-olefinically unsaturated acyclic hydrocarbon with molecular hydrogen in liquid phase and in the presence of a metal hydrogenation catalyst at a temperature below about 30° C., and under a hydrogen pressure of at least 5 atmospheres and reacting the resulting mixture with molecular hydrogen in liquid phase and in the presence of a metal hydrogenation catalyst at a temperature above about 90° C. and a hydrogen pressure of at least 5 atmospheres, the said ozonide and the said molecular hydrogen being the only reactants and the said metal catalyst being the only catalyst charged to the reaction system.

5. The process of claim 4 in which the ozonide is the ozonide of an alkene-1 of 6 to 18 carbon atoms.

6. A process for the production of alpha, omega-aliphatic diols which comprises reacting an ozonide of a mono-olefinically unsaturated cyclic hydrocarbon containing the olefinic unsaturation as part of the cyclic ring with molecular hydrogen in liquid phase and in the presence of a metal hydrogenation catalyst at a temperature below about 30° C., and under a hydrogen pressure of at least 5 atmospheres and reacting the resulting mixture with molecular hydrogen in liquid phase and in the presence of a metal hydrogenation catalyst at a temperature above about 90° C. and a hydrogen pressure of at least 5 atmospheres, the said ozonide and the said molecular hydrogen being the only reactants and the said metal catalyst being the only catalyst charged to the reaction system.

References Cited in the file of this patent

UNITED STATES PATENTS

| | | |
|---|---|---|
| 2,523,742 | Warner et al. | Sept. 26, 1950 |
| 2,614,107 | Wender et al. | Oct. 14, 1952 |
| 2,671,812 | Sparks et al. | Mar. 9, 1954 |

OTHER REFERENCES

Henne et al., J. A. C. S., vol. 65, pp. 2183–5 (1943).

Weygand: Organic Preparations, Interscience Pub. (1945), p. 458.